United States Patent
Ford et al.

(10) Patent No.: US 6,191,238 B1
(45) Date of Patent: *Feb. 20, 2001

(54) PROCESS FOR PRODUCING POLYOLEFINS

(75) Inventors: Randal Ray Ford; Jeffrey James Vanderbilt; Roxanna Lea Whitfield; Glenn Edward Moore, all of Longview, TX (US)

(73) Assignee: Eastman Chemical Company, Kingsport, TN (US)

( * ) Notice: Under 35 U.S.C. 154(b), the term of this patent shall be extended for 0 days.

This patent is subject to a terminal disclaimer.

(21) Appl. No.: 09/387,365

(22) Filed: Aug. 31, 1999

(51) Int. Cl.$^7$ ............................. C08F 4/648; C08F 10/02
(52) U.S. Cl. ......................... 526/74; 526/138; 526/142; 526/144; 526/236; 526/901
(58) Field of Search .................... 526/74, 125.8, 526/138, 147, 236, 901, 142, 144

(56) References Cited

U.S. PATENT DOCUMENTS

| | | |
|---|---|---|
| Re. 33,683 | 9/1991 | Allen et al. . |
| 3,113,115 | 12/1963 | Ziegler et al. . |
| 3,354,139 | 11/1967 | Vandenberg . |
| 3,594,330 | 7/1971 | Delbouille et al. . |
| 3,644,318 | 2/1972 | Diedrich et al. . |
| 3,676,415 | 7/1972 | Diedrich et al. . |
| 3,709,853 | 1/1973 | Karapinka . |
| 3,917,575 | 11/1975 | Matsuura et al. . |
| 4,003,712 | 1/1977 | Miller . |
| 4,011,382 | 3/1977 | Levine et al. . |
| 4,012,573 | 3/1977 | Trieschmann et al. . |
| 4,070,419 * | 1/1978 | Watson ........................ 526/236 X |
| 4,076,698 | 2/1978 | Anderson et al. . |
| 4,105,847 | 8/1978 | Ito et al. . |
| 4,148,754 | 4/1979 | Strobel et al. . |
| 4,256,866 | 3/1981 | Karayannis et al. . |
| 4,298,713 | 11/1981 | Morita et al. . |
| 4,302,566 | 11/1981 | Karol et al. . |
| 4,311,752 | 1/1982 | Diedrich et al. . |
| 4,363,904 | 12/1982 | Fraser et al. . |
| 4,481,301 | 11/1984 | Nowlin et al. . |
| 4,532,311 | 7/1985 | Fulks et al. . |
| 4,543,399 | 9/1985 | Jenkins, III et al. . |
| 4,673,719 | 6/1987 | Kioka et al. . |
| 4,716,206 | 12/1987 | Fujita et al. . |
| 4,739,105 | 4/1988 | Toyota et al. . |
| 4,792,592 | 12/1988 | Fulks et al. . |
| 4,803,251 | 2/1989 | Goode et al. . |
| 4,855,370 | 8/1989 | Chirillo et al. . |
| 4,876,320 | 10/1989 | Fulks et al. . |
| 4,882,400 | 11/1989 | Dumain et al. . |
| 5,034,479 | 7/1991 | Eisinger et al. . |
| 5,162,463 | 11/1992 | Baker et al. . |
| 5,194,526 | 3/1993 | Hussein et al. . |
| 5,200,477 | 4/1993 | Baker et al. . |
| 5,229,076 | 7/1993 | Fagher . |
| 5,283,278 | 2/1994 | Daire et al. . |
| 5,352,749 | 10/1994 | DeChellis et al. . |
| 5,385,991 | 1/1995 | Yamaguchi et al. . |
| 5,416,175 | 5/1995 | Song et al. . |
| 5,432,236 | 7/1995 | Sano et al. . |
| 5,541,270 | 7/1996 | Chinh et al. . |
| 5,625,012 | 4/1997 | Hussein et al. . |
| 5,677,375 | 10/1997 | Rifi et al. . |
| 5,731,392 | 3/1998 | Ali et al. . |
| 5,780,379 | 7/1998 | Fiasse . |
| 5,834,571 | 11/1998 | Bernier et al. . |
| 5,883,203 | 3/1999 | Cheruvu et al. . |
| 5,948,872 | 9/1999 | Kioka et al. . |

FOREIGN PATENT DOCUMENTS

| | | |
|---|---|---|
| 839380 | 9/1976 | (BE) . |
| 991798 | 6/1976 | (CA) . |
| 0 359 444 A1 | 3/1990 | (EP) . |
| 0 703 246 A1 | 3/1996 | (EP) . |
| 0 529 977 B1 | 4/1998 | (EP) . |
| 851113 * | 10/1960 | (GB) . |

OTHER PUBLICATIONS

*Chemical & Engineering News*, 1985, p. 27, vol. 63, Issue 5.

* cited by examiner

Primary Examiner—Fred Teskin
(74) Attorney, Agent, or Firm—Jonathan D. Wood; Bernard J. Graves, Jr.; Harry J. Gwinnell

(57) ABSTRACT

A novel process for producing homopolymers and interpolymers of olefins which involves contacting an olefin and/or an olefin and at least one or more other olefin(s) under polymerization conditions with a Ziegler-Natta catalyst and dinitrogen monoxide in an amount sufficient to reduce the electrostatic charge in the polymerization medium. Also provided is a process for reducing electrostatic charge in the polymerization of an olefin by adding dinitrogen monoxide.

42 Claims, No Drawings

PROCESS FOR PRODUCING POLYOLEFINS

FIELD OF INVENTION

The present invention relates to a polymerization process for the production of polyolefins utilizing a Ziegler-Natta catalyst and dinitrogen monoxide in amounts sufficient to reduce the electrostatic charge in the polymerization reactor. The use of dinitrogen monoxide as a catalytic agent further provides polyolefins that are suitable for molding and film applications.

BACKGROUND OF INVENTION

Polyolefins such as polyethylene are well known and are useful in many applications. In particular, linear polyethylene polymers possess properties which distinguish them from other polyethylene polymers, such as branched ethylene homopolymers commonly referred to as LDPE (low density polyethylene). Certain of these properties are described by Anderson et al, U.S. Pat. No. 4,076,698.

A particularly useful polymerization medium for producing polyethylene and polypropylene polymers is a gas phase process. Examples of such are given in U.S. Pat. Nos. 3,709,853; 4,003,712; 4,011,382; 4,302,566; 4,543,399; 4,882,400; 5,352,749 and 5,541,270 and Canadian Patent No. 991,798 and Belgian Patent No. 839,380.

Ziegler-Natta catalysts for the polymerization of olefins are well known in the art and have been known at least since the issuance of U.S. Pat. No. 3,113,115. Thereafter, many patents have been issued relating to new or improved Ziegler-Natta catalysts. Exemplary of such patents are U.S. Pat. Nos. 3,594,330; 3,676,415; 3,644,318; 3,917,575; 4,105,847; 4,148,754; 4,256,866; 4,298,713; 4,311,752; 4,363,904; 4,481,301 and Reissue 33,683.

These patents disclose Ziegler-Natta catalysts that are well known as typically consisting of a transition metal component and a co-catalyst that is typically an organoaluminum compound. Optionally used with the catalyst are activators such as halogenated hydrocarbons and activity modifiers such as electron donors.

The use of halogenated hydrocarbons with Ziegler-Natta polymerization catalysts in the production of polyethylene is disclosed in U.S. Pat. No. 3,354,139 and European Patent Nos. EP 0 529 977 B1 and EP 0 703 246 A1. As disclosed, the halogenated hydrocarbons may reduce the rate of ethane formation, improve catalyst efficiency, or provide other effects.

It is also well known in the polymerization of olefins, particularly where Ziegler-Natta catalysts are employed, to utilize, optionally, electron donors. Such electron donors often aid in increasing the efficiency of the catalyst and/or in controlling the stereospecificity of the polymer when an olefin, other than ethylene, is polymerized. Electron donors when employed during the catalyst preparation step are referred to as internal electron donors. Electron donors when utilized other than during the catalyst preparation step are referred to as external electron donors. For example, the external electron donor may be added to the preformed catalyst, to the prepolymer, and/or to the polymerization medium.

The above catalysts are, or can be, supported on inert porous particulate carrier.

A generally encountered problem in polymerization processes, in particular gas phase polymerization processes, is the formation of agglomerates. Agglomerates can form in various places such as the polymerization reactor and the lines for recycling the gaseous stream. As a consequence of agglomerate formation it may be necessary to shut down the reactor.

When agglomerates form within the polymerization reactor there can be many adverse effects. For example, the agglomerates can disrupt the removal of polymer from the polymerization reactor by plugging the polymer discharge system. Further, if the agglomerates fall and cover part of the fluidization grid a loss of fluidization efficiency may occur. This can result in the formation of larger agglomerates which can lead to the loss of the entire fluidized bed. In either case there may be the necessity for the shutdown of the reactor.

It has been found that agglomerates may be formed as a result of the presence of very fine polymer particles in the polymerization medium. These fine polymer particles may be present as a result of introducing fine catalyst particles or breakage of the catalyst within the polymerization medium.

These fine particles are believed to deposit onto and electrostatically adhere to the inner walls of the polymerization reactor and the associated equipment for recycling the gaseous stream such as, for example, the heat exchanger. If the fine particles remain active, and the polymerization reaction continues, then the particles will grow in size resulting in the formation of agglomerates. These agglomerates when formed within the polymerization reactor tend to be in the form of sheets.

Several solutions have been proposed to resolve the problem of formation of agglomerates in gas phase polymerization processes. These solutions include the deactivation of the fine polymer particles, control of the catalyst activity and the reduction of the electrostatic charge. Exemplary of the solutions are as follows.

European Patent Application 0 359 444 A1 describes the introduction into the polymerization reactor of small amounts of an activity retarder in order to keep substantially constant either the polymerization rate or the content of transition metal in the polymer produced. The process is said to produce a polymer without forming agglomerates.

U.S. Pat. No. 4,739,015 describes the use of gaseous oxygen containing compounds or liquid or solid active-hydrogen containing compounds to prevent the adhesion of the polymer to itself or to the inner wall of the polymerization apparatus.

In U.S. Pat. No. 4,803,251 there is described a process for reducing sheeting utilizing a group of chemical additives which generate both positive and negative charges in the reactor, and which are fed to the reactor in an amount of a few parts per million(ppm) per part of the monomer in order to prevent the formation of undesired positive or negative charges.

Other processes and other additives that may be used to neutralize electrostatic charge in the fluidized-bed reactor are found in U.S. Pat. Nos. 4,792,592; 4,803,251; 4,855,370; 4,876,320; 5,162,463; 5,194,526 and 5,200,477.

Additional processes for reducing or eliminating electrostatic charge include (1) installation of grounding devices in a fluidized bed, (2) ionization of gas or particles by electrical discharge to generate ions which neutralize electrostatic charge on the particles and (3) the use of radioactive sources to produce radiation capable of generating ions which neutralize electrostatic charge on the particles.

It would be desirable therefore to provide a process for producing polyolefins, particularly polyethylene, wherein the problems associated with electrostatic charge are reduced.

SUMMARY OF THE INVENTION

The polymerization process of the present invention comprises the introduction into a polymerization medium comprising an olefin, particularly ethylene, and optionally at least one or more other olefin(s), a Ziegler-Natta catalyst and dinitrogen monoxide ($N_2O$) in an amount sufficient to reduce the electrostatic charge in the polymerization medium to a level lower than would occur in the same polymerization process in the absence of dinitrogen monoxide.

The present invention also relates to a process for reducing electrostatic charge in the polymerization of an olefin, particularly ethylene, and optionally at least one or more other olefin(s) in a polymerization medium, particularly gas phase, in the presence of a Ziegler-Natta catalyst, and dinitrogen monoxide ($N_2O$) in an amount sufficient to reduce electrostatic charge in the polymerization medium to a level lower than would occur in the same polymerization process in the absence of the dinitrogen monoxide.

All mention herein to elements of Groups of the Periodic Table are made in reference to the Periodic Table of the Elements, as published in "Chemical and Engineering News", 63(5), 27, 1985. In this format, the Groups are numbered 1 to 18.

DETAILED DESCRIPTION OF THE INVENTION

The polymerization process of the present invention comprises the introduction into a polymerization medium comprising an olefin, particularly ethylene, and optionally at least one or more other olefin(s), a Ziegler-Natta catalyst and dinitrogen monoxide ($N_2O$) in an amount sufficient to reduce the electrostatic charge in the polymerization medium to a level lower than would occur in the same polymerization process in the absence of the dinitrogen monoxide.

The present invention also relates to a process for reducing electrostatic charge in the polymerization of an olefin, particularly ethylene, and optionally at least one or more other olefin(s) in a polymerization medium, particularly gas phase, in the presence of a Ziegler-Natta catalyst, and dinitrogen monoxide ($N_2O$) in an amount sufficient to reduce electrostatic charge in the polymerization medium to a level lower than would occur in the same polymerization process in the absence of the dinitrogen monoxide.

The polymerization reaction of the present invention is carried out in the presence of at least one Ziegler-Natta catalyst. In the process of the invention, the catalyst can be introduced in any manner known in the art. For example, the catalyst can be introduced directly into the fluidized bed reactor in the form of a solution, a slurry or a dry free flowing powder. The catalyst can also be used in the form of a deactivated catalyst, or in the form of a prepolymer obtained by contacting the catalyst with one or more olefins.

The Ziegler-Natta catalysts utilized herein are well known in the industry. The Ziegler-Natta catalysts in the simplest form are comprised of a component comprising at least one transition metal and a co-catalyst comprising at least one organometallic compound. The metal of the transition metal component is a metal selected from Groups 4, 5, 6, 7, 8, 9 and/or 10 of the Periodic Table of the Elements, as published in "Chemical and Engineering News", 63(5), 27, 1985. In this format, the groups are numbered 1–18. Exemplary of such transition metals are titanium, zirconium, vanadium, chromium, manganese, iron, cobalt, nickel, and the like, and mixtures thereof. In a preferred embodiment the transition metal is selected from the group consisting of titanium, zirconium, vanadium and chromium, and in a still further preferred embodiment, the transition metal is titanium. The Ziegler-Natta catalyst can optionally contain magnesium and/or chlorine. Such magnesium and chlorine containing catalysts may be prepared by any manner known in the art.

The co-catalyst used in the process of the present invention can be any organometallic compound, or mixtures thereof, that can activate the transition metal component in a Ziegler-Natta catalyst in the polymerization of olefins. In particular, the organometallic co-catalyst compound that is reacted with the transition metal component contains a metal selected from Groups 1, 2, 11, 12, 13 and/or 14 of the above described Periodic Table of the Elements. Exemplary of such metals are lithium, magnesium, copper, zinc, boron, silicon and the like, or mixtures thereof.

Preferably the co-catalyst is at least one compound of the formula,

$$X_nER_{3-n},$$

or mixtures thereof,
wherein,
X is hydrogen, halogen, or mixtures of halogens, selected from fluorine, chlorine, bromine and iodine;
n ranges from 0 to 2;
E is an element from Group 13 of the Periodic Table of Elements such as boron, aluminum and gallium; and
R is a hydrocarbon group, containing from 1 to 100 carbon atoms and from 0 to 10 oxygen atoms, connected to the Group 13 element by a carbon or oxygen bond.

Exemplary of the R group suitable for use herein is $C_{1-100}$ alkyl, $C_{1-100}$ alkoxy, $C_{2-100}$ alkenyl, $C_{4-100}$ dienyl, $C_{3-100}$ cycloalkyl, $C_{3-100}$ cycloalkoxy, $C_{3-100}$ cycloalkenyl, $C_{4-100}$ cyclodienyl, $C_{6-100}$ aryl, $C_{7-100}$ aralkyl, $C_{7-100}$ aralkoxy and $C_{7-100}$ alkaryl. Also exemplary of the R group are hydrocarbons containing from 1 to 100 carbon atoms and from 1 to 10 oxygen atoms.

Exemplary of the co-catalyst used in the process of the present invention where n=0 are trimethylaluminum; triethylborane; triethylgallane; triethylaluminum; tri-n-propylaluminum; tri-n-butylaluminum; tri-n-pentylaluminum; triisoprenylaluminum; tri-n-hexylaluminum; tri-n-heptylaluminum; tri-n-octylaluminum; triisopropylaluminum; triisobutylaluminum; tris(cylcohexylmethyl)aluminum; dimethylaluminum methoxide; dimethylaluminum ethoxide; diethylaluminum ethoxide and the like. Exemplary of compounds where n=1 are dimethylaluminum chloride; diethylaluminum chloride; di-n-propylaluminum chloride; di-n-butylaluminum chloride; di-n-pentylaluminum chloride; diisoprenylaluminum chloride; di-n-hexylaluminum chloride; di-n-heptylaluminum chloride; di-n-octylaluminum chloride; diisopropylaluminum chloride; diisobutylaluminum chloride; bis(cylcohexylmethyl)aluminum chloride; diethylaluminum fluoride; diethylaluminum bromide; diethylaluminum iodide; dimethylaluminum hydride; diethylaluminum hydride; di-n-propylaluminum hydride; di-n-butylaluminum hydride; di-n-pentylaluminum hydride; diisoprenylaluminum hydride; di-n-hexylaluminum hydride; di-n-heptylaluminum hydride; di-n-octylaluminum hydride; diisopropylaluminum hydride; diisobutylaluminum hydride; bis(cylcohexylmethyl)aluminum hydride; chloromethylaluminum methoxide; chloromethylaluminum ethoxide; chloroethylaluminum ethoxide and the like. Exemplary of compounds where n=2 are methylaluminum dichloride; ethylaluminum dichloride; n-propylaluminum dichloride; n-butylaluminum dichloride; n-pentylaluminum dichloride; isoprenylaluminum dichloride; n-hexylaluminum dichloride; n-heptylaluminum dichloride; n-octylaluminum dichloride; isopropylaluminum dichloride; isobutylaluminum dichloride; (cylcohexylmethyl)aluminum dichloride and the like. Also exemplary are alkylaluminum sesquialkoxides such as methylaluminum sesquimethoxide; ethylaluminum sesquiethoxide; n-butylaluminum sesqui-n-butoxide and the like. Also exemplary are alkylaluminum sesquihalides such as methylaluminum sesquichloride; ethylaluminum sesquichloride; isobutylaluminum sesquichloride; ethylaluminum sesquifluoride; ethylaluminum sesquibromide; ethylaluminum sesquiiodide and the like.

Preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum, tri-n-decylaluminum; and dialkylaluminum halides such as dimethylaluminum chloride, diethylaluminum chloride, dibutylaluminum chloride, diisobutylaluminum chloride, diethylaluminum bromide and diethylaluminum iodide; and alkylaluminum sesquihalides such as methylaluminum sesquichloride, ethylaluminum sesquichloride, n-butylaluminum sesquichloride, isobutylaluminum sesquichloride, ethylaluminum sesquifluoride, ethylaluminum sesquibromide and ethylaluminum sesquiiodide.

Most preferred for use herein as co-catalysts are trialkylaluminums such as trimethylaluminum, triethylaluminum, tri-n-propylaluminum, tri-n-butylaluminum, triisobutylaluminum, tri-n-hexylaluminum, triisohexylaluminum, tri-2-methylpentylaluminum, tri-n-octylaluminum and dialkylaluminum halides such as dimethylaluminum chloride, diethylaluminum chloride, dibutylaluminum chloride, diisobutylaluminum chloride and alkylaluminum sesquihalides such as methylaluminum sesquichloride, ethylaluminum sesquichloride, n-butylaluminum sesquichloride and isobutylaluminum sesquichloride.

Mixtures of the above co-catalysts also can be utilized herein as the co-catalyst.

Any or all of the components of the Ziegler-Natta catalyst can be supported on a carrier. The carrier can be any particulate organic or inorganic material. Preferably the carrier particle size should not be larger than about 200 microns in diameter. The most preferred particle size of the carrier material can be easily established by experiment. Preferably, the carrier should have an average particle size of 5 to 200 microns in diameter, more preferably 10 to 150 microns and most preferably 20 to 100 microns.

Examples of suitable inorganic carriers include metal oxides, metal hydroxides, metal halogenides or other metal salts, such as sulphates, carbonates, phosphates, nitrates and silicates. Exemplary of inorganic carriers suitable for use herein are compounds of metals from Groups 1 and 2 of the of the Periodic Table of the Elements, such as salts of sodium or potassium and oxides or salts of magnesium or calcium, for instance the chlorides, sulphates, carbonates, phosphates or silicates of sodium, potassium, magnesium or calcium and the oxides or hydroxides of, for instance, magnesium or calcium. Also suitable for use are inorganic oxides such as silica, titania, alumina, zirconia, chromia, boron oxide, silanized silica, silica hydrogels, silica xerogels, silica aerogels, and mixed oxides such as talcs, silica/chromia, silica/chromia/titania, silica/alumina, silica/titania, silica/magnesia, silica/magnesia/titania, aluminum phosphate gels, silica co-gels and the like. The inorganic oxides may contain small amounts of carbonates, nitrates, sulfates and oxides such as $Na_2CO_3$, $K_2CO_3$, $CaCO_3$, $MgCO_3$, $Na_2SO_4$, $Al_2(SO_4)_3$, $BaSO_4$, $KNO_3$, $Mg(NO_3)_2$, $Al(NO_3)_3$, $Na_2O$, $K_2O$ and $Li_2O$. Carriers containing at least one component selected from the group consisting of $MgCl_2$, $SiO_2$, $Al_2O_3$ or mixtures thereof as a main component are preferred.

Examples of suitable organic carriers include polymers such as, for example, polyethylene, polypropylene, interpolymers of ethylene and alphaolefins, polystyrene, functionalized polystyrene, polyamides and polyesters.

In the event that the Ziegler-Natta catalyst is to be used in prepolymer form, the co-catalyst used to form the prepolymer can be any organometallic compound comprising a metal selected from Groups 1, 2, 11, 12, 13 and/or 14 of the above described Periodic Table of the Elements. Exemplary of such metals are lithium, magnesium, copper, zinc, boron, silicon and the like. When a prepolymer is employed in the polymerization medium additional co-catalyst(s), if utilized, may be the same or different as that utilized in preparing the prepolymer. When utilized, external electron donor(s) and/or halogenated hydrocarbon(s) can be added to the prepolymer.

The Ziegler-Natta catalyst may contain conventional components in addition to the transition metal component and the co-catalyst. For example, there may be added any magnesium compound, halogenated hydrocarbon and the like.

Furthermore there may be added to the Ziegler-Natta catalyst any electron donor. The electron donor compound preferably is selected from the group consisting of carboxylic acid esters, anhydrides, acid halides, ethers, thioethers, aldehydes, ketones, imines, arnines, amides, nitriles, isonitriles, cyanates, isocyanates, thiocyanates, isothiocyanates, thioesters, dithioesters, carbonic esters, hydrocarbyl carbamates, hydrocarbyl thiocarbamates, hydrocarbyl dithiocarbamates, urethanes, sulfoxides, sulfones, sulfonamides, organosilicon compounds containing at least one oxygen atom, and nitrogen, phosphorus, arsenic or antimony compounds connected to an organic group through a carbon or oxygen atom. More preferred as electron donors are compounds containing from 1 to 50 carbon atoms and from 1 to 30 heteroatoms of an element, or mixtures thereof, selected from Groups 14, 15, 16 and 17 of the Periodic Table of Elements.

The Ziegler-Natta catalyst may be prepared by any method known in the art. The catalyst can be in the form of a solution, a slurry or a dry free flowing powder. The amount of Ziegler-Natta catalyst used is that which is sufficient to allow production of the desired amount of the polyolefin.

Any halogenated hydrocarbon may be used in the process of the present invention. If desired more than one halogenated hydrocarbon can be used. Typical of such halogenated hydrocarbons are monohalogen and polyhalogen substituted saturated or unsaturated aliphatic, alicyclic, or aromatic hydrocarbons having 1 to 12 carbon atoms.

Preferred for use in the process of the present invention are dichloromethane; dibromomethane; chloroform; carbon tetrachloride; bromochloromethane; chlorofluoromethane; bromodichloromethane; chlorodifluromethane; fluorodichloromethane; chlorotrifluoromethane; fluorotrichloromethane; 1,2-dichloroethane; 1,2-dibromoethane; 1-chloro-1-fluoroethane; 1-chloro-1,1-difluoroethane; 1-chloro-1 ,2-difluoroethane; 2-chloro-1,1-difluoroethane;

1,1,1,2-tetrafluoroethane; 1,1,1,2-tetrachloroethane; 2-chloro-1,1,1-trifluoroethane; 1,1-dichloro-2,2-difluoroethane; 1,2-dichloro-1,2-difluoroethane; hexafluoroethane; hexachloroethane; chloropentafluoroethane; 1,2-dibromotetrachloroethane; 1,1,2,2-tetrachloroethylene; 1-chloro-1,2,2-trifluorothylene; 1-fluoro-1,2,2-trichloroethylene; hexafluoropropene; hexachlorocyclopentadiene and hexachloropropene.

Most preferred for use in the process of the present invention are dichloromethane; chloroform; carbon tetrachloride; chlorofluoromethane; chlorodifluromethane; dichlorodifluoromethane, fluorodichloromethane; chlorotrifluoromethane; fluorotrichloromethane; 1,2-dichloroethane; 1,2-dibromoethane; 1,1,1,2-tetrachloroethane; 2-chloro-1,1,1-trifluoroethane; 1,1 -dichloro-2,2-difluoroethane; 1,2-dichloro-1,2-difluoroethane; hexafluoroethane; hexachloroethane; hexafluoropropene ; hexachlorocyclopentadiene and hexachloropropene.

The halogenated hydrocarbons may be used individually or as mixtures thereof.

The polymerization process of the present invention may be carried out using any suitable process, for example, solution, slurry and gas phase. A particularly desirable method for producing polyolefin polymers according to the present invention is a gas phase polymerization process preferably utilizing a fluidized bed reactor. This type reactor and means for operating the reactor are well known and completely described in U.S Pat. Nos. 3,709,853; 4,003,712; 4,011,382; 4,012,573; 4,302,566; 4,543,399; 4,882,400; 5,352,749; 5,541,270; Canadian Patent No. 991,798 and Belgian Patent No. 839,380. These patents disclose gas phase polymerization processes wherein the polymerization medium is either mechanically agitated or fluidized by the continuous flow of the gaseous monomer and diluent. The entire contents of these patents are incorporated herein by reference.

In general, the polymerization process of the present invention may be effected as a continuous gas phase process such as a fluid bed process. A fluid bed reactor for use in the process of the present invention typically comprises a reaction zone and a so-called velocity reduction zone. The reaction zone comprises a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream is at a rate equal to the rate at which particulate polymer product and monomer associated therewith is withdrawn from the reactor and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

In more detail, the reactor temperature of the fluid bed process herein ranges from about 30° C. to about 150° C. In general, the reactor temperature is operated at the highest temperature that is feasible taking into account the sintering temperature of the polymer product within the reactor.

The process of the present invention is suitable for the production of homopolymers of olefins, particularly ethylene, and/or copolymers, terpolymers, and the like, of olefins, particularly ethylene, and at least one or more other olefin(s). Preferably the olefins are alpha-olefins. The olefins, for example, may contain from 2 to 16 carbon atoms. Particularly preferred for preparation herein by the process of the present invention are polyethylenes. Such polyethylenes are preferably homopolymers of ethylene and interpolymers of ethylene and at least one alpha-olefin wherein the ethylene content is at least about 50% by weight of the total monomers involved. Exemplary olefins that may be utilized herein are ethylene, propylene, 1-butene, 1-pentene, 1-hexene, 1-heptene, 1-octene, 4-methylpent-1-ene, 1-decene, 1-dodecene, 1-hexadecene and the like. Also utilizable herein are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

In the process of the invention, the catalyst components can be introduced in any manner known in the art. For example, the catalyst components can be introduced directly into the polymerization medium in the form of a solution, a slurry or a dry free flowing powder. The catalyst components can be premixed to form an activated catalyst prior to addition to the polymerization medium; the components can be added separately to the polymerization medium; or the components can be premixed and then contacted with one or more olefins to form a prepolymer and then added to the polymerization medium in prepolymer form. When the catalyst components are premixed prior to introduction into the reactor, any electron donor compound may be added to the catalyst to control the level of activity of the catalyst. Furthermore during the polymerization reaction being carried out in the presence of the Ziegler-Natta catalyst, as above described, there may be added additional organometallic co-catalyst compound(s). The additional organometallic co-catalyst compound may be the same or different from that used to form the Ziegler-Natta catalyst.

In carrying out the polymerization process of the present invention, the co-catalyst(s) is added to the polymerization medium in any amount sufficient to effect production of the desired ethylene/olefin interpolymer. It is preferred to utilize the co-catalyst(s) in a molar ratio of co-catalyst(s) to metal component(s) of the olefin polymerization catalyst ranging from about 0.5:1 to about 1000:1. In a more preferred embodiment, the molar ratio of co-catalyst(s) to metal component(s) ranges from about 0.5:1 to about 100:1.

In carrying out the polymerization process of the present invention the dinitrogen monoxide used to reduce electrostatic charge in the polymerization medium is added in any manner. For example, the dinitrogen monoxide may be added to the preformed catalyst, to the prepolymer during the prepolymerization step, to the preformed prepolymer and/or to the polymerization medium. The dinitrogen monoxide may optionally be premixed with the co-catalyst when utilized. The dinitrogen monoxide is added in any amount sufficient to reduce the electrostatic charge in the polymerization medium to a level lower than would occur in the same polymerization process in the absence of the compound. It is preferred to incorporate the dinitrogen monoxide in an amount in the polymerization medium ranging from about 1 ppm to about 10,000 ppm by volume.

If a gas phase fluidized bed process is utilized for polymerization of the olefin, it may be advantageous to add the dinitrogen monoxide prior to the heat removal means, e.g., the heat exchanger, to slow the rate of fouling of said heat removal means in addition to reducing the electrostatic charge in the polymerization reactor.

In carrying out the polymerization process of the present invention, the halogenated hydrocarbon may be added to the polymerization medium in any amount sufficient to effect production of the desired polyolefin. It is preferred to incorporate the halogenated hydrocarbon in a molar ratio of halogenated hydrocarbon to metal component of the olefin polymerization catalyst ranging from about 0.001:1 to about 100:1. In a more preferred embodiment, the molar ratio of halogenated hydrocarbon to metal component ranges from about 0.001:1 to about 10:1.

The molecular weight of the polyolefin produced by the present invention can be controlled in any known manner, for example, by using hydrogen. The molecular weight control of polyethylene, for example, may be evidenced by an increase in the melt index ($I_2$) of the polymer when the molar ratio of hydrogen to ethylene in the polymerization medium is increased.

Any conventional additive may be added to the polyolefins obtained by the present invention. Examples of the additives include nucleating agents, heat stabilizers, antioxidants of phenol type, sulfur type and phosphorus type, lubricants, antistatic agents, dispersants, copper harm inhibitors, neutralizing agents, foaming agents, plasticizers, anti-foaming agents, flame retardants, crosslinking agents, flowability improvers such as peroxides, ultraviolet light absorbers, light stabilizers, weathering stabilizers, weld strength improvers, slip agents, anti-blocking agents, anti-fogging agents, dyes, pigments, natural oils, synthetic oils, waxes, fillers and rubber ingredients.

The polyolefins, particularly polyethylenes, of the present invention may be fabricated into films by any technique known in the art. For example, films may be produced by the well known cast film, blown film and extrusion coating techniques.

Further, the polyolefins, particularly polyethylenes, may be fabricated into other articles of manufacture, such as molded articles, by any of the well known techniques.

The invention will be more readily understood by reference to the following examples. There are, of course, many other forms of this invention which will become obvious to one skilled in the art, once the invention has been fully disclosed, and it will accordingly be recognized that these examples are given for the purpose of illustration only, and are not to be construed as limiting the scope of this invention in any way.

EXAMPLES

In the following examples the test procedures listed below were used in evaluating the analytical properties of the polyolefins herein.

a) Density is determined according to ASTM D-4883 from a plaque made according to ASTM D1928;

b) Melt Index (MI), $I_2$, is determined in accord with ASTM D-1238, condition E, measured at 190° C., and reported as decigrams per minute;

c) High Load Melt Index (HLMI), $I_{21}$, is measured in accord with ASTM D-1238, Condition F, measured at 10.0 times the weight used in the melt index test (MI) above;

d) Melt Flow Ratio (MFR)=$_{21}/I_2$ or High Load Melt Index/Melt Index;

e) Residual Titanium Content in the Product. The residual titanium content in the product is measured by X-Ray Fluorescence Spectroscopy (XRF) using a Philips Sequential X-Ray Spectrometer Model PW 1480. The samples of the polymer to be evaluated were compression molded into a circular shaped plaque approximately 43 mm in diameter so as to fit the sample holder on the spectrometer and 3 to 5 mm in thickness and having a smooth flat surface. The molded test specimens were then placed in the XRF unit and the x-ray fluorescence arising from the titanium in the test specimen was measured. The residual titanium content was then determined based on a calibration curve obtained by measurements from polyethylene calibration specimens containing a known amount of titanium. The residual titanium content is reported as parts per million (ppm) relative to the polymer matrix.

The Ziegler-Natta catalyst used in Example 1 was prepared in accordance with Example 1-a of European Patent Application EP 0 703 246 A1. The catalyst was used in prepolymer form and was prepared in accordance with Example 1-b of European Patent Application EP 0 703 246 A1. A prepolymer containing about 34 grams of polyethylene per millimole of titanium was thus obtained.

Polymerization Process

The polymerization process utilized in Example 1 herein was carried out in a fluidized-bed reactor for gas-phase polymerization, consisting of a vertical cylinder of diameter 0.74 meters and height 7 meters and surmounted by a velocity reduction chamber. The reactor is provided in its lower part with a fluidization grid and with an external line for recycling gas, which connects the top of the velocity reduction chamber to the lower part of the reactor, at a point below the fluidization grid. The recycling line is equipped with a compressor for circulating gas and a heat transfer means such as a heat exchanger. In particular the lines for supplying ethylene, 1-hexene, hydrogen and nitrogen, which represent the main constituents of the gaseous reaction mixture passing through the fluidized bed, feed into the recycling line. Above the fluidization grid, the reactor contains a fluidized bed consisting of a polyethylene powder made up of particles with a weight-average diameter of about 0.5 mm to about 1.4 mm. The gaseous reaction mixture, which contains ethylene, olefin comonomer, hydrogen, nitrogen and minor amounts of other components, passes through the fluidized bed under a pressure ranging from about 280 psig to about 300 psig with an ascending fluidization speed, referred to herein as fluidization velocity, ranging from about 1.6 feet per second to about 2.1 feet per second.

In Example 1 the Ziegler-Natta catalyst, as described above in prepolymer form, was introduced intermittently into the reactor. The said catalyst contained magnesium, chlorine and titanium. The prepolymer form contained about 34 grams of polyethylene per millimole of titanium and an amount of tri-n-octylaluminum (TnOA) such that the molar ratio, Al/Ti, was about 1.1:1. The rate of introduction of the prepolymer into the reactor was adjusted to achieve the desired production rate. During the polymerization the additional co-catalyst, when utilized, was introduced continuously into the line for recycling the gaseous reaction mixture, at a point situated downstream of the heat transfer means. The feed rate of additional co-catalyst is expressed as a molar ratio of trialkylaluminum to titanium (Al/Ti), and is defined as the ratio of the co-catalyst feed rate (in moles of trialkylaluminum per hour) to the prepolymer feed rate (in moles of titanium per hour). A solution of chloroform ($CHCl_3$) in n-hexane, at a concentration of about 0.5 weight percent, was introduced continuously into the line for recycling the gaseous reaction mixture. The feed rate of the optional halogenated hydrocarbon is expressed as a molar ratio of $CHCl_3$ to titanium ($CHCl_3/Ti$), and is defined as the ratio of the $CHCl_3$ feed rate (in moles of $CHCl_3$ per hour) to the catalyst or prepolymer feed rate (in moles of titanium per hour).

Dinitrogen monoxide ($N_2O$), when utilized in the following examples, was utilized to reduce the electrostatic charge in the polymerization medium. The gaseous dinitrogen monoxide was introduced continuously into the line for recycling the gaseous reaction mixture. The concentration of dinitrogen monoxide in the polymerization medium is expressed in units of ppm by volume.

The electrostatic charge of the fluidized bed was measured by a Correflow Model 3400 Electrostatic Monitor (ESM) supplied by Auburn International, Inc. of Danvers, Massachusetts. The electrostatic probe was installed in the vertical cylindrical section of the reactor at a height such as to be within the fluidized bed of polymer particles. The electrostatic probe measures the current flow between the polymerization medium and the ground. A reduction in electrostatic charge is defined as a reduction in the absolute magnitude of the measured current and/or a reduction in the variability of the measured current.

Example 1

The initial process conditions are given in Table 1. The polymerization reactor was lined out producing a interpolymer of ethylene and 1-hexene having a melt index of 0.6 dg/min and a density of 0.920 g/cc. The level of electrostatic charge was measured. Thereafter, dinitrogen monoxide was added to the reactor loop at a level of 60 ppm by volume. Trimethylaluminum was added to maintain the production rate at 160 pounds per hour. The level of electrostatic charge in the polymerization reactor was measured and it was found that the level of electrostatic charge was reduced as a result of adding the dinitrogen monoxide.

TABLE 1

Initial Reactor Conditions for Example 1

| | |
|---|---|
| Reactor Pressure (psig) | 296 |
| Reactor Temperature (° C.) | 86 |
| Fluidization Velocity (ft/sec) | 2.1 |
| Fluidized Bulk Density (lb/ft$_3$) | 16.1 |
| Reactor Bed Height (ft) | 10.9 |
| Ethylene (mole %) | 26 |
| $H_2/C_2$ (molar ratio) | 0.145 |
| $C_6/C_2$ (molar ratio) | 0.146 |
| $CHCl_3/Ti$ | 0.04 |
| Prepolymer Rate (lb/h) | 0.8 |
| Production Rate (lb/h) | 160 |
| Residual Titanium (ppm) | 8.5 |
| Density (g/cc) | 0.920 |
| Melt Index, $I_2$ (dg/min) | 0.6 |
| Melt Flow Ratio ($I_{21}/I_2$) | 29 |

Example 2

The process of Example 1 is followed with the following exceptions. The Ziegler-Natta catalyst used in Example 2 is obtained from Toho Titanium Company, Limited under the product name THC-C. The catalyst is a titanium-based catalyst supported on magnesium chloride. This catalyst is added directly to the polymerization medium. Trimethylaluminum is added as co-catalyst to the polymerization medium. The catalyst addition rate and the co-catalyst addition rate are adjusted to produce about 200 pounds of polymeric product per hour having a residual titanium content of about 1 ppm.

Furthermore the $C_6/C_2$ and the $H_2/C_2$ molar ratios are adjusted to produce an ethylene/1-hexene interpolymer having a target melt index of about 0.6 dg/min and a target density of about 0.920 g/cc.

The level of electrostatic charge in the polymerization reactor is measured. Thereafter, dinitrogen monoxide is added to the polymerization medium and the level of electrostatic charge is expected to be reduced.

Example 3

The process of Example 1 is followed with the following exceptions. The Ziegler-Natta catalyst used in Example 3 is obtained from Grace Davison, Baltimore, Maryland under the product name XPO-502 1. The catalyst is a titanium-based catalyst supported on silica. This catalyst is added directly to the polymerization medium. Triethylaluminum is added as co-catalyst to the polymerization medium. The catalyst addition rate and the co-catalyst addition rate are adjusted to produce about 200 pounds of polymeric product per hour having a residual titanium content of about 1 ppm.

Furthermore the $C_6/C_2$ and the $H_2/C_2$ molar ratios are adjusted to produce an ethylene/1-hexene interpolymer having a target melt index of about 0.6 dg/min and a target density of about 0.920 g/cc.

The level of electrostatic charge in the polymerization reactor is measured. Thereafter, dinitrogen monoxide is added to the polymerization medium and the level of electrostatic charge is expected to be reduced.

Films can be prepared from the polyolefins of the present invention.

Articles such as molded items can also be prepared from the polyolefins of the present invention.

It should be clearly understood that the forms of the invention herein described are illustrative only and are not intended to limit the scope of the invention. The present invention includes all modifications falling within the scope of the following claims.

We claim:

1. A process for polymerizing an olefin and/or an olefin and at least one or more other olefin(s) comprising contacting, under polymerization conditions, in a polymerization medium wherein electrostatic charge is present, the olefin and/or an olefin and at least one or more other olefin(s) with at least one Ziegler-Natta catalyst comprising a component comprising at least one transition metal and a co-catalyst comprising at least one organometallic compound, and dinitrogen monoxide ($N_2O$), wherein the dinitrogen monoxide is present in an amount sufficient to reduce electrostatic charge in the polymerization medium to a level lower than would be obtained in the absence of the dinitrogen monoxide.

2. The process according to claim 1 wherein the at least one transition metal is selected from Groups 4, 5, 6, 7, 8, 9 and/or 10 of the Periodic Table of the Elements, as defined herein.

3. The process according to claim 2 wherein the transition metal is selected from the group consisting of titanium, zirconium, vanadium, iron, chromium, nickel and mixtures thereof.

4. The process according to claim 3 wherein the metal is selected from the group consisting of titanium, zirconium, vanadium and mixtures thereof.

5. The process according to claim 1 wherein the metal of the at least one organometallic compound is selected from Groups 1, 2, 11, 12, 13 and/or 14 of the Periodic Table of the Elements, as defined herein.

6. The process according to claim 5 wherein the at least one organometallic compound has the formula, $$X_nER_{3-n},$$

or mixtures thereof,
wherein
X is hydrogen, halogen, or mixtures of halogens, selected from fluorine, chlorine, bromine and iodine,
n ranges from 0 to 2,
E is an element from Group 13 of the Periodic Table of Elements, and
R is a hydrocarbon group, containing from 1 to 100 carbon atoms and from 0 to 10 oxygen atoms, connected to the Group 13 element by a carbon or oxygen bond.

7. The process according to claim 5 wherein the organometallic compound is selected from the group consisting of trialkylaluminums, dialkylaluminum halides and alkylaluminum sesquihalides.

8. The process according to claim 7 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexylaluminum, tri-2-methylpentylaluminum, and tri-n-octylaluminum, the dialkylaluminum halide is selected from the group consisting of dimethylaluminum chloride, diethylaluminum chloride, dibutylaluminum chloride, and diisobutylaluminum chloride, and the alkylaluminum sesquihalide is selected from the group consisting of methylaluminum sesquichloride, ethylaluminum sesquichloride, n-butylaluminum sesquichloride, and isobutylaluminum sesquichloride.

9. The process according to claim 8 wherein the trialkylaluminum is selected from the group consisting of trimethylaluminum and triethylaluminum.

10. The process according to claim 1 further comprising the presence of at least one electron donor.

11. The process according to claim 10 wherein tetrahydrofuran is an electron donor.

12. The process according to claim 1 further comprising the presence of at least one halogenated hydrocarbon.

13. The process according to claim 12 wherein chloroform is a halogenated hydrocarbon.

14. The process according to claim 1 further comprising the presence of at least one electron donor and at least one halogenated hydrocarbon.

15. The process according to claim 14 wherein the co-catalyst is trimethylaluminum, the electron donor is tetrahydrofuran and the halogenated hydrocarbon is chloroform.

16. The process according to claim 15 wherein the transition metal is titanium.

17. The process according to claim 1 wherein the dinitrogen monoxide is present in the polymerization medium in an amount ranging from about 1 ppm to about 10,000 ppm by volume.

18. The process according to claim 1 wherein the polymerization conditions are gas phase.

19. The process according to claim 1 wherein the polymerization conditions are solution phase.

20. The process according to claim 1 wherein the polymerization conditions are slurry phase.

21. The process according to claim 1 wherein at least one olefin is ethylene.

22. A process for reducing electrostatic charge in a polymerization medium comprising contacting, under polymerization conditions, at least one or more olefin(s) with at least one Ziegler-Natta catalyst comprising a component comprising at least one transition metal and a co-catalyst comprising at least one organometallic compound, and dinitrogen monoxide ($N_2O$), wherein the dinitrogen monoxide is present in an amount sufficient to reduce electrostatic charge in the polymerization medium to a level lower than would be obtained in the absence of the dinitrogen monoxide.

23. The process according to claim 22 wherein the at least one transition metal is selected from Groups 4, 5, 6, 7, 8, 9 and/or 10 of the Periodic Table of the Elements, as defined herein.

24. The process according to claim 23 wherein the transition metal is selected from the group consisting of titanium, zirconium, vanadium, iron, chromium, nickel and mixtures thereof.

25. The process according to claim 24 wherein the metal is selected from the group consisting of titanium, zirconium, vanadium and mixtures thereof.

26. The process according to claim 22 wherein the metal of the at least one organometallic compound is selected from Groups 1, 2, 11, 12, 13 and/or 14 of the Periodic Table of the Elements, as defined herein.

27. The process according to claim 26 wherein the at least one organometallic compound has the formula, $$X_nER_{3-n},$$

or mixtures thereof,
wherein
X is hydrogen, halogen, or mixtures of halogens, selected from fluorine, chlorine, bromine and iodine,
n ranges from 0 to 2,
E is an element from Group 13 of the Periodic Table of Elements, and
R is a hydrocarbon group, containing from 1 to 100 carbon atoms and from 0 to 10 oxygen atoms, connected to the Group 13 element by a carbon or oxygen bond.

28. The process according to claim 26 wherein the organometallic compound is selected from the group consisting of trialkylaluminums, dialkylaluminum halides and alkylaluminum sesquihalides.

29. The process according to claim 28 wherein the trialkylaluminum is selected from the group consisting of trimethylaluminum, triethylaluminum, tri-n-propylaluminum, tri-n-butylaluminum, triisobutylaluminum, tri-n-hexylaluminum, triisohexylaluminum, tri-2-methylpentylaluminum, and tri-n-octylaluminum, the dialkylaluminum halide is selected from the group consisting of dimethylaluminum chloride, diethylaluminum chloride, dibutylaluminum chloride, and diisobutylaluminum chloride, and the alkylaluminum sesquihalide is selected from the group consisting of methylaluminum sesquichloride, ethylaluminum sesquichloride, n-butylaluminum sesquichloride and isobutylaluminum sesquichloride.

30. The process according to claim 29 wherein the trialkylaluminum is selected from the group consisting of trimethylaluminum and triethylaluminum.

31. The process according to claim 22 further comprising the presence of at least one electron donor.

32. The process according to claim 31 wherein tetrahydrofuran is an electron donor.

33. The process according to claim 22 further comprising the presence of at least one halogenated hydrocarbon.

34. The process according to claim 33 wherein chloroform is a halogenated hydrocarbon.

35. The process according to claim 22 further comprising the presence of at least one electron donor and at least one halogenated hydrocarbon.

36. The process according to claim 35 wherein the organometallic co-catalyst compound is trimethylaluminum, the electron donor is tetrahydrofuran and the halogenated hydrocarbon is chloroform.

37. The process according to claim 36 wherein the transition metal is titanium.

38. The process according to claim 22 wherein the dinitrogen monoxide is present in the polymerization medium in an amount ranging from about 1 ppm to about 10,000 ppm by volume.

39. The process according to claim 22 wherein the polymerization conditions are gas phase.

40. The process according to claim 22 wherein the polymerization conditions are solution phase.

41. The process according to claim 22 wherein the polymerization conditions are slurry phase.

42. The process according to claim 22 wherein at least one olefin is ethylene.

* * * * *